United States Patent [19]

Katsumata

[11] Patent Number: 5,208,279
[45] Date of Patent: May 4, 1993

[54] WEATHER-RESISTANT POLYACETAL RESIN COMPOSITION

[75] Inventor: Toru Katsumata, Shizuoka, Japan

[73] Assignee: Polyplastics Co., Ltd., Osaka, Japan

[21] Appl. No.: 720,455

[22] PCT Filed: May 7, 1991

[86] PCT No.: PCT/JP91/00605
§ 371 Date: Jun. 25, 1991
§ 102(e) Date: Jun. 25, 1991

[87] PCT Pub. No.: WO91/17212
PCT Pub. Date: Nov. 14, 1991

[30] Foreign Application Priority Data

May 7, 1990 [JP] Japan ............................ 2-118371

[51] Int. Cl.$^5$ ............... C08K 5/3435; C08K 5/3475; C08K 5/20; C08K 5/13
[52] U.S. Cl. .................................. 524/91; 524/100; 524/102; 524/208; 524/291; 524/336; 524/337
[58] Field of Search ............... 525/64; 524/208, 337, 524/100, 91, 291, 336, 102

[56] References Cited

U.S. PATENT DOCUMENTS

| | | | |
|---|---|---|---|
| 3,749,755 | 7/1973 | Bronstert et al. | 525/337 |
| 4,556,690 | 12/1985 | Nakawaga | 525/64 |
| 4,639,488 | 1/1987 | Schuette et al. | 524/456 |
| 4,975,478 | 12/1990 | Okuda | 524/86 |
| 5,039,741 | 8/1991 | Burg et al. | 525/64 |
| 5,059,644 | 10/1991 | Kosinski | 524/100 |
| 5,079,282 | 1/1992 | Okuda | 524/91 |
| 5,118,734 | 6/1992 | Katsumata | 524/91 |

*Primary Examiner*—Veronica P. Hoke
*Attorney, Agent, or Firm*—Nixon & Vanderhye

[57] ABSTRACT

A weather-resistant polyacetal resin composition which comprises
(A) 100 part by weight of a polyacetal resin,
(B) 0.01 to 5 parts by weight of a weathering (light) stabilizer and
(C) 0.5 to 60 parts by weight of a graft copolymer comprising (a) an olefin (co)polymer and (b) one or more vinyl (co)polymers which are chemically bonded to each other to form a branched or crosslinked structure.

The surface of a molded article made from the composition is excellent in weathering resistance, so that it undergoes less crack and reduced discoloration.

7 Claims, No Drawings

WEATHER-RESISTANT POLYACETAL RESIN COMPOSITION

FIELD OF INDUSTRIAL APPLICATION

The present invention relates to a polyacetal resin composition excellent in weathering (light) resistance. More particularly, the present invention provides a polyacetal resin composition extremely excellent in weathering resistance which is prepared by adding a weathering stabilizer and a specific graft copolymer to a polyacetal resin, and a molded article thereof.

PRIOR ART

As well known, a polyacetal resin has recently been used in an extremely wide field as an engineering plastic excellent in physical characteristics such as mechanical and electrical properties and chemical characteristics such as resistances to chemicals and heat. As the application field of a polyacetal resin has enlarged, however, the resin has been frequently required to exhibit unique properties as the material. One of such unique properties is weathering (light) resistance and the resin has been expected to be further improved in this respect. That is, automobile interior or exterior trim parts and components of electrical appliances and business machines suffer from various troubles in long-term service depending upon the service conditions such as exposure to sunlight, fluorescent lamp, rain or the open air. For example, they discolor, lose their surface smoothness to exhibit lowered gloss, or cause surface crack to result in impaired surface appearance. In order to overcome these disadvantages, it has been proposed to improve the weathering (light) resistance of a polyacetal resin by the addition of various weathering (light) stabilizers and/or polycarbonate or acrylic resins thereto.

Although the weathering (light) resistance of a polyacetal resin is improved to some extent by these means, a molded article made from the resulting composition is not always satisfactory in respect of surface appearance (such as crack and gloss) and mechanical properties, when exposed to sunlight (ultraviolet rays) and rain in the outdoor for a long period of time. Therefore, a polyacetal resin composition further improved in weathering (light) resistance has been frequently demanded.

Even if the amount of the weathering (light) stabilizer or acrylic resin to be added is increased for the purpose of satisfying the demand, the improvement attained by the addition thereof has a limit. Further, the increase in the amount of such additive has various disadvantages and problems that it brings about lowering in the mechanical properties (particularly, tensile elongation and Izod impact strength) and that the resulting composition fails in mold release, sticks in cavity or deposits on the mold surface (i.e., forms so-called mold deposit) in molding, so that the resulting molded article is poor in dimensional accuracy and surface appearance and that the frequency of mold cleaning increases to lower the working efficiency in molding.

DISCLOSURE OF THE INVENTION

The inventors of the present invention have eagerly studied for the purpose of further improving the weathering (light) resistance of a polyacetal resin in outdoor service without impairing the characteristics inherent in the resin and have accomplished the present invention.

Namely, the present invention relates to a weather resistant polyacetal resin composition which comprises (A) 100 parts by weight of a polyacetal resin,
(B) 0.01 to 5 parts by weight of a weathering (light) stabilizer and
(C) 0.5 to 60 parts by weight of a graft copolymer comprising (a) an olefin (co)polymer and (b) one or more vinyl (co)polymers which are chemically bonded to each other to form a branched or crosslinked structure.

The polyacetal resin (A) to be used in the present invention is a polymer mainly composed of oxymethylene ($-CH_2O-$) units, which may be either a polyoxymethylene homopolymer or a copolymer, terpolymer or block copolymer containing small amounts of other constituent units in addition to the oxymethylene units. Further, these (co)polymers may be linear, branched or crosslinked. Furthermore, the degree of polymerization thereof is not particularly limited.

Preferred examples of the weathering (light) stabilizer (B) to be used in the present invention include ① benzotriazoles, ② benzophenones, ③ aromatic benzoates, ④ cyanoacrylates, ⑤ oxalanilides and ⑥ hindered amines, which may be used either alone or as a mixture of two or more of them.

Particular examples of these stabilizers are as follows.

Namely, particular examples of the benzotriazole ① include 2-(2'-hydroxy-5'-methylphenyl)benzotriazole, 2-(2'-hydroxy-3',5'-di-t-butylphenyl)benzotriazole, 2-(3,5-di-t-amyl-2-hydroxyphenyl)benzotriazole, 2-(2'-hydroxy-3',5'-diisoamylphenyl)benzotriazole, 2-[2-hydroxy-3,5-bis($\alpha,\alpha$-dimethylbenzyl)phenyl]benzotriazole and 2-(2'-hydroxy-4'-octoxyphenyl)benzotriazole.

Particular examples of the benzophenone ② include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy- 4,4'-dimethoxybenzophenone, 2-hydroxy-4-methoxy-5-sulfobenzophenone and 2-hydroxy-4-oxybenzylbenzophenone.

Particular examples of the aromatic benzoate ③ include p-t butylphenyl salicylate and p-octylphenyl salicylate.

Particular examples of the cyanoacrylate ④ include 2-ethylhexyl 2-cyano-3,3-diphenylacrylate and ethyl 2-cyano-3,3-diphenylacrylate.

Particular examples of the oxalanilide ⑤ include N-(2-ethylphenyl)-N'-(2-ethoxy-5-t-butylphenyl)oxalamide and N-(2-ethylphenyl)-N'-(2-ethoxyphenyl)oxalamide.

The hindered amine ⑥ is a piperidine derivative having a sterically hindering group and examples thereof include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl) oxalate, bis(2,2,6,6,-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethyl-4-piperidyl) sebacate, bis(2,2,6,6-tetramethyl-4-piperidyl) terephthalate, 1,2-bis(2,2,6,6-tetramethyl-4-piperidyloxy)e- thane, bis(2,2,6,6-tetramethyl-4-piperidyl) hexamethylene-1,6-dicarbamate, bis(1-methyl-2,2,6,6-tetramethyl-4-piperidyl) adipate and tris(2,2,6,6-tetramethyl-4-piperidyl) benzene-1,3,5-tricarboxylate. Further, high-molecular weight polycondensates of a piperidine derivative, such as dimethyl succinate-1-(2-hydroxyethyl)-4-hydroxy-2,2,6,6-tetramethylpiperidine polycondensate are effectively used.

These weathering (light) stabilizers may be added either alone or as a mixture of two or more of them. Particularly, a combination of one of the weathering stabilizers ① to ⑤ with a hindered amine ⑥ is preferable.

It is suitable that the weathering (light) stabilizer (B) be used in an amount of 0.01 to 5 parts by weight, particularly 0.02 to 3 parts by weight, per 100 parts by weight of the component (A). When the amount of the stabilizer (B) is too small, no effect will be attained. On the contrary, the addition thereof in too large an amount will be uneconomical and will bring about problems such as lowering in the mechanical properties and staining of molds.

The graft copolymer to be used in the present invention as the component (C) is one comprising (a) an olefin (co)polymer and (b) one or more vinyl (co)polymers which are chemically bonded to each other to form a branched or crosslinked structure.

The olefin (co)polymer (a) constituting the backbone of the graft copolymer (C) includes olefin homopolymers such as polyethylene, polypropylene and polybutene and copolymers mainly composed of these homopolymers. Such copolymers include ethylene-α-olefin copolymers such as ethylene-propylene copolymer and ethylene-1-butene copolymer; copolymers comprising ethylene and unsaturated carboxylic acid ester; and epoxidized ethylene copolymers.

The above unsaturated carboxylic acid ester includes alkyl esters of unsaturated carboxylic acids having 3 to 8 carbon atoms, such as acrylic and methacrylic acids. Particular examples thereof include methyl acrylate, ethyl acrylate, propyl acrylate, isopropyl acrylate, n-butyl acrylate, isobutyl acrylate, methyl methacrylate, ethyl methacrylate, propyl methacrylate, isopropyl methacrylate, n-butyl methacrylate and isobutyl methacrylate, among which ethyl acrylate and methyl methacrylate are preferable.

The epoxidized ethylene copolymer is a bipolymer comprising ethylene and an unsaturated glycidyl monomer or a ternary or higher polymer comprising ethylene, an unsaturated glycidyl monomer and other unsaturated monomer(s).

The above unsaturated glycidyl monomer includes glycidyl acrylate, glycidyl methacrylate, monoglycidyl itaconate, vinyl glycidyl ether and allyl glycidyl ether, among which glycidyl methacrylate is particularly preferable. The unsaturated monomer to be copolymerized with ethylene and an unsaturated glycidyl monomer according to the present invention includes olefins such as propylene, butene-1 and styrene; vinyl esters such as vinyl acetate and vinyl propionate; and esters such as methyl and ethyl esters of acrylic and methacrylic acids, among which acrylates are particularly preferable.

Among the olefin (co)polymers described above, it is particularly preferable to use polyethylene, an ethylene-ethyl acrylate copolymer or an ethylene-glycidyl methacrylate copolymer as the component (a).

Then, the vinyl (co)polymer (b) to be graft-polymerized onto the olefin (co)polymer (a) is a (co)polymer prepared by the polymerization of one or more monomers selected from among (meth)acrylates such as methyl (meth)acrylate, ethyl (meth)acrylate, propyl (meth)acrylate and butyl (meth)acrylate; aromatic vinyl monomers such as styrene, methylstyrene and ethylstyrene; acrylonitrile and vinyl acetate. It is particularly preferable to use polymethyl methacrylate or an acrylonitrile-styrene copolymer.

Among graft copolymers comprising the segments described above, a graft copolymer prepared by the graft polymerization of polymethyl methacrylate or an acrylonitrile-styrene copolymer (b) onto polyethylene or an ethylene-ethyl acrylate copolymer (a) is particularly preferable.

In the present invention, an olefin (co)polymer (a) which serves as the constituent of the backbone chain of the component (C) and a vinyl (co)polymer (b) which are different from each other in properties are used not alone but as a graft copolymer wherein the polymers (a) and (b) are chemically bonded to each other at at least one point to form a branched or crosslinked structure. As will be described below, the use of such a graft copolymer gives remarkable effects which cannot be attained by the use of either of the polymers (a) and (b).

Although the process for the preparation of the graft copolymer (C) comprising the segments (a) and (b) is not particularly limited, it may be, for example, one disclosed in Japanese Patent Laid-Open No. 312313/1988 or 98663/1989. Particularly, it is suitable that the graft copolymer (C) have a multi-phase structure. In the graft copolymer (C), the ratio of the segment (a) to the segment (b) is between 95:5 and 5:95, preferably between 80:20 and 20:80, still preferably between 60:40 and 40:60.

The amount of the component (C) is 0.5 to 60 parts by weight, preferably 1 to 40 parts by weight per 100 parts by weight of the component (A). When the amount is too small, the weathering (light) resistance will not be improved sufficiently, while when it is too large, the mechanical properties and the heat stability will be adversely affected unfavorably.

A polyacetal resin can be effectively improved in weathering (light) resistance, particularly resistances to surface crack and surface discoloration, by the simultaneous use of the graft copolymer (C) with a weathering (light) stabilizer (B).

In a molded piece made from a composition comprising a polyacetal resin (A), a weathering stabilizer (B) and a specific graft copolymer (C), the graft copolymer (C) containing the stabilizer (B) is dispersed selectively on the surface of the piece in the form of particles having a size of about 0.5 to 2 μm to give a modified surface, which is presumed to bring about the above functions and effects leading to the improvement of the weathering resistance.

It is desirable that the composition of the present invention be further improved in, e.g., heat stability by the addition of various known stabilizers. For this purpose, it is desirable to use one or more stabilizers selected from among known antioxidants, nitrogen compounds and alkali or alkaline earth metal compounds.

Further, the composition of the present invention may be suitably colored by the addition of various carbon blacks or other various dyes and pigments.

Particularly, the use of carbon black further serves to improve the weathering (light) resistance effectively.

The composition of the present invention may further contain one or more conventional additives in order to impart thereto desired characteristics depending upon the object and examples of the additives include lubricant, nucleating agent, mold release agent, antistatic agent and other surfactants; organic polymers other than the component (C); and inorganic or organic fibrous, powdery or flakyl fillers.

The composition of the present invention can be prepared with conventional equipment for the preparation of synthetic resin compositions by a conventional process therefor. That is, necessary components are mixed together and the obtained mixture is kneaded and extruded with a single- or twin-screw extruder into molding pellets, followed by the molding of the pellets. Alternatively, the preparation of the composition may be conducted in a molding machine simultaneously with the molding. Further, a process which comprises preliminarily pulverizing a part or the whole of the resin components, mixing the obtained powder with the rest of the components, melt-extruding the obtained mixture into pellets and molding the pellets may be employed in order to facilitate the dispersion and mixing of the components.

The stabilizers and additives described above may be added in any arbitrary stage. For example, they may be added just before the completion of the preparation of a final molded article.

The resin composition of the present invention may be molded by any process selected from among extrusion, injection, compression molding, vacuum forming, blow molding and expansion molding.

The composition of the present invention prepared by adding a specific graft copolymer having a branched or crosslinked structure to a polyacetal resin containing a weathering stabilizer exhibits remarkably improved surface appearance even when exposed to ultraviolet rays and water for a long period of time. Particularly, it exhibits remarkable effects of extremely retarding crack generation, enchancing gloss retention and reducing discoloration.

Further, the composition is improved also in respect of retention of mechanical properties (such as tensile elongation) and moldabilty, though the acrylic-modified polyacetal resin compositions of the prior art are problematic in these respects. Accordingly, the weather-resistant polyacetal resin composition of the present invention can be favorably used in the production of various molded parts necessitating weathering resistance, i.e., those which are unavoidably exposed to the open air such as sunlight and rain for a long period of time, for example, automobile exterior trim parts (such as outer handle, fuel lid or front fender spoiler); automobile interior trim parts (such as inner handle, regulator handle or interior clip); parts of electrical appliances, camera or other industrial products; and building materials, pipe, sundries and housewares.

EXAMPLE

The present invention will now be described by referring to the following Examples, though the present invention is not limited by them.

The methods employed in the Examples for evaluating the characteristic values such as weathering (light) resistance are as follows.

(1) Weathering test (A, B)

A test piece was examined for crack initiation time and change in surface appearance with the two testers which will be described below.

test method A: A test piece was irradiated with ultraviolet rays in a weatherometer [mfd. by Suga Test Instrument Co., Ltd., WBL-SUN-HCH type] under the conditions of black panel temperature of 63° C. and weathering (including rainfall) to evaluate the weathering resistance thereof.

test method B: A test piece was irradiated with ultraviolet rays with a fadeometer [mfd. by Suga Test Instrument Co., Ltd., FAL-AU.H.B Em type] at a black panel temperature of 83° C. to evaluate the weathering resistance thereof.

① crack initiation time

A test piece was irradiated with ultraviolet rays with the above tester under the predetermined conditions, while observing the surface thereof with a 10 x magnifier. The time elapsed until first crack had been found was regarded as crack initiation time. A higher value means a better resistance.

② change in surface appearance

A test piece was irradiated with ultraviolet rays with the above tester under the predetermined conditions for a predetermined time (600, 1000 or 2000 hours) to determine the change thereof in color and gloss before and after the irradiation visually. These changes were classified into five ranks and shown. A smaller value means a less change, i.e., less lowering in gloss and less discoloration.

(2) Tensile test

A test piece was examined for tensile strength and elongation according to ASTM D 638.

EXAMPLES 1 TO 20 AND COMPARATIVE EXAMPLES 1 TO 20

As shown in Table 1, a weathering (light) stabilizer (B), a graft copolymer and, if necessary, carbon black were added to a polyacetal resin (A) [a product of Polyplastics Co., Ltd., trade name "Duracon (M 90)"], followed by mixing. The obtained mixture was melt-kneaded and extruded with a 30-mm twin-screw extruder into pellets. The pellets were molded with an injection molding machine into test pieces. These test pieces were examined and evaluated respectively for weathering resistance and other characteristics. For comparison, as shown in Table 2, polyacetal resin compositions each containing a weathering (light) stabilizer (B) or a graft copolymer (C) (or carbon black) alone and polyacetal resin composition each containing the component (a) or (b) instead of the component (C) together with a weathering (light) stabilizer were prepared and examined in a similar manner to that described above.

The results are given in Tables 1 and 2.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| (A) polyacetal resin (pts. wt.) | 100 | 100 | 100 | 100 | 100 | 100 | 100 | 100 | 100 | 100 |

TABLE 1-continued

| | | | 1 | 2 | 3 | 4 | 5 | 6 | 7 | 8 | 9 | 10 |
|---|---|---|---|---|---|---|---|---|---|---|---|---|
| (B) weathering (light) stabilizer | | note 1 (pts. wt.) | B-1 0.6 | | B-1 0.3 | B-1 0.3 | B-1 0.3 | B-1 0.3 | B-1 0.3 | B-1 0.3 | B-1 0.3 | B-1 0.3 |
| | | note 2 (pts. wt.) | | B-3 0.6 | B-3 0.3 | B-3 0.3 | B-3 0.3 | B-3 0.3 | B-3 0.3 | B-3 0.3 | B-3 0.3 | B-3 0.3 |
| (C) graft copolymer | | note 3 (pts. wt.) | C-1 10 | C-1 10 | C-1 5 | C-1 10 | C-1 20 | C-1 40 | C-2 10 | C-2 20 | C-3 10 | C-3 20 |
| carbon black (pts. wt.) | | | | | | | | | | | | |
| weathering test A | crack initiation time (hr) | | 1080 | 960 | 1320 | 1620 | 1920 | 2000 | 1560 | 1920 | 1500 | 1740 |
| | surface appearance | 600-hour irradn. | 1 | 1 | 1 | 1 | 1 | 1 | 1 | 1 | 1 | 1 |
| | | 1000-hour irradn. | 2 | 2 | 2 | 1 | 1 | 1 | 1 | 1 | 1 | 1 |
| | | 2000-hour irradn. | 4 | 4 | 4 | 1 | 1 | 1 | 2 | 1 | 2 | 2 |
| weathering test B | crack initiation time (hr) | | 960 | 880 | 1080 | 1400 | 1740 | 1860 | 1400 | 1680 | 1340 | 1480 |
| | surface appearance | 600-hour irradn. | 1 | 2 | 1 | 1 | 1 | 1 | 1 | 1 | 1 | 1 |
| | | 1000-hour irradn. | 3 | 3 | 2 | 1 | 1 | 1 | 1 | 1 | 2 | 1 |
| | | 2000-hour irradn. | 5 | 5 | 4 | 3 | 2 | 1 | 3 | 2 | 4 | 3 |
| tensile test | elongation (%) | | 43 | 44 | 51 | 43 | 28 | 19 | 88 | 99 | 45 | 29 |
| | strength (kg/cm$^2$) | | 545 | 542 | 575 | 540 | 511 | 505 | 485 | 462 | 540 | 515 |

| | | | Example | | | | | | | | | |
|---|---|---|---|---|---|---|---|---|---|---|---|---|
| | | | 11 | 12 | 13 | 14 | 15 | 16 | 17 | 18 | 19 | 20 |
| (A) polyacetal resin (pts. wt.) | | | 100 | 100 | 100 | 100 | 100 | 100 | 100 | 100 | 100 | 100 |
| (B) weathering (light) stabilizer | | note 1 (pts. wt.) | B-1 0.3 | B-1 0.3 | B-1 0.3 | B-1 0.3 | B-1 0.3 | B-1 0.3 | B-1 0.3 | B-1 0.3 | B-1 0.3 | B-1 0.3 |
| | | note 2 (pts. wt.) | B-3 0.3 | B-3 0.3 | B-3 0.3 | B-3 0.3 | B-3 0.3 | B-3 0.3 | B-3 0.3 | B-3 0.3 | B-3 0.3 | B-3 0.3 |
| (C) graft copolymer | | note 3 (pts. wt.) | C-4 10 | C-4 20 | C-5 10 | C-1 10 | C-1 10 | C-1 10 | C-2 10 | C-2 10 | C-1 10 | C-2 10 |
| carbon black (pts. wt.) | | | | | | | | | | | 0.5 | 0.5 |
| weathering test A | crack initiation time (hr) | | 1500 | 1800 | 1400 | 1440 | 1320 | 1140 | 1440 | 1260 | 1940 | 1880 |
| | surface appearance | 600-hour irradn. | 1 | 1 | 1 | 1 | 1 | 1 | 1 | 1 | 1 | 1 |
| | | 1000-hour irradn. | 1 | 1 | 1 | 1 | 1 | 1 | 1 | 1 | 1 | 1 |
| | | 2000-hour irradn. | 3 | 2 | 3 | 3 | 3 | 4 | 3 | 3 | 1 | 1 |
| weathering test B | crack initiation time (hr) | | 1400 | 1600 | 1140 | 1200 | 1080 | 1020 | 1200 | 1080 | 1800 | 1740 |
| | surface appearance | 600-hour irradn. | 1 | 1 | 1 | 1 | 1 | 1 | 1 | 1 | 1 | 1 |
| | | 1000-hour irradn. | 1 | 1 | 2 | 2 | 2 | 2 | 2 | 2 | 1 | 1 |
| | | 2000-hour irradn. | 3 | 2 | 4 | 4 | 5 | 4 | 4 | 4 | 2 | 2 |
| tensile test | elongation (%) | | 52 | 23 | 47 | 42 | 44 | 41 | 85 | 90 | 41 | 81 |
| | strength (kg/cm$^2$) | | 557 | 520 | 558 | 539 | 540 | 540 | 498 | 493 | 551 | 492 |

TABLE 2

| | | | Comparative Example | | | | | | | | | |
|---|---|---|---|---|---|---|---|---|---|---|---|---|
| | | | 1 | 2 | 3 | 4 | 5 | 6 | 7 | 8 | 9 | 10 |
| (A) polyacetal resin (pts. wt.) | | | 100 | 100 | 100 | 100 | 100 | 100 | 100 | 100 | 100 | 100 |
| (B) weathering (light) stabilizer | | note 1 (pts. wt.) | B-1 0.6 | | B-1 0.3 | | | | | | | |
| | | note 2 (pts. wt.) | | B-3 0.6 | B-3 0.3 | | | | | | | |
| (c) graft copolymer | | note 3 (pts. wt.) | | | | C-1 5 | C-1 10 | C-1 20 | C-2 10 | C-2 20 | C-3 10 | C-3 20 |
| (a) PE note 4 (pts. wt.) | | | | | | | | | | | | |
| EEA note 4 (pts. wt.) | | | | | | | | | | | | |
| (b) PMMA note 4 (pts. wt.) | | | | | | | | | | | | |
| carbon black (pts. wt.) | | | | | | | | | | | | |
| weathering test A | crack initiation time (hr) | | 300 | 240 | 420 | 300 | 420 | 540 | 420 | 540 | 360 | 480 |
| | surface appearance | 600-hour irradn. | 3 | 4 | 2 | 3 | 3 | 2 | 3 | 2 | 3 | 3 |
| | | 1000-hour irradn. | 5 | 5 | 5 | 5 | 4 | 4 | 4 | 4 | 5 | 4 |
| | | 2000-hour irradn. | 5 | 5 | 5 | 5 | 5 | 5 | 5 | 5 | 5 | 5 |

TABLE 2-continued

| | | | | | | | | | | | |
|---|---|---|---|---|---|---|---|---|---|---|---|
| weathering test B | crack initiation time (hr) | 260 | 180 | 360 | 240 | 380 | 460 | 380 | 420 | 300 | 420 |
| | surface appearance | 600-hour irradn. | 3 | 4 | 3 | 3 | 3 | 2 | 3 | 3 | 3 | 3 |
| | | 1000-hour irradn. | 5 | 5 | 5 | 5 | 4 | 3 | 4 | 4 | 5 | 4 |
| | | 2000-hour irradn. | 5 | 5 | 5 | 5 | 5 | 5 | 5 | 5 | 5 | 5 |
| tensile test | elongation (%) | 71 | 70 | 70 | 49 | 43 | 29 | 91 | 98 | 42 | 33 |
| | strength (kg/cm²) | 595 | 607 | 600 | 581 | 539 | 502 | 481 | 470 | 545 | 515 |

| | | Comparative Example | | | | | | | | | |
|---|---|---|---|---|---|---|---|---|---|---|---|
| | | 11 | 12 | 13 | 14 | 15 | 16 | 17 | 18 | 19 | 20 |
| (A) polyacetal resin (pts. wt.) | | 100 | 100 | 100 | 100 | 100 | 100 | 100 | 100 | 100 | 100 |
| (B) weathering (light) stabilizer | note 1 (pts. wt.) | | | B-1 0.3 | B-1 0.3 | B-1 0.3 | B-1 0.3 | B-1 0.3 | B-1 0.3 | B-2 0.3 | B-1 0.3 |
| | note 2 (pts. wt.) | | | B-3 0.3 | B-3 0.3 | B-3 0.3 | B-3 0.3 | B-3 0.3 | B-4 0.3 | B-3 0.3 | B-3 0.3 |
| (c) graft copolymer | note 3 (pts. wt.) | C-4 10 | C-5 10 | | | | | | | | |
| (a) PE note 4 (pts. wt.) | | | | 10 | | | | | | | |
| EEA note 4 (pts. wt.) | | | | | 10 | | 10 | | | | |
| (b) PMMA note 4 (pts. wt.) | | | | | | 10 | 10 | 20 | | | |
| carbon black (pts. wt.) | | | | | | | | | | | 0.5 |
| weathering test A | crack initiation time (hr) | 420 | 300 | 360 | 540 | 660 | 660 | 960 | 360 | 320 | 480 |
| | surface appearance | 600-hour irradn. | 3 | 3 | 4 | 2 | 2 | 2 | 1 | 4 | 4 | 2 |
| | | 1000-hour irradn. | 4 | 5 | 5 | 4 | 4 | 4 | 2 | 5 | 5 | 4 |
| | | 2000-hour irradn. | 5 | 5 | 5 | 5 | 5 | 5 | 4 | 5 | 5 | 5 |
| weathering test B | crack initiation time (hr) | 380 | 240 | 300 | 480 | 540 | 520 | 880 | 300 | 240 | 420 |
| | surface appearance | 600-hour irradn. | 3 | 4 | 4 | 3 | 2 | 2 | 1 | 4 | 4 | 2 |
| | | 1000-hour irradn. | 5 | 5 | 5 | 5 | 4 | 4 | 3 | 5 | 5 | 4 |
| | | 2000-hour irradn. | 5 | 5 | 5 | 5 | 5 | 5 | 4 | 5 | 5 | 5 |
| tensile test | elongation (%) | 45 | 46 | 40 | 97 | 25 | 50 | 13 | 69 | 72 | 62 |
| | strength (kg/cm²) | 555 | 560 | 528 | 497 | 590 | 540 | 595 | 608 | 600 | 595 | note 1
B-1: 2-[2-hydroxy-3,5-bis(α, α-dimethylbenzyl)phenyl]benzotriazole
B-2: 2-hydroxy-4-oxybenzylbenzophenone
note 2
B-3: bis(2,2,6,6-tetramethyl-4-piperidyl) sebacate
B-4: dimethyl succinate-1-(2-hydroxyethyl)-4-hydroxy-2,2,6,6-tetramethylpiperidine polycondensate
note 3
C-1: PE-g-PMMA graft copolymer comprising polyethylene (50) and polymethyl methacrylate (50)
C-2: E/EA-g-PMMA graft copolymer comprising ethylene-ethyl acrylate copolymer (50) and polymethyl methacrylate (50)
C-3: E/GMA-g-PMMA graft copolymer comprising ethylene-glycidyl methacrylate copolymer (50) and polymethyl methacrylate (50)
C-4: PE-g-PMMA graft copolymer comprising polyethylene (70) and polymethyl methacrylate (30)
C-5: E/EA-g-AN/S graft copolymer comprising ethylene-ethyl acrylate copolymer (70) and acrylonitrile-styrene copolymer (30)
note 4
PE: polyethylene
EEA: ethylene-ethyl acrylate copolymer
PMMA: polymethyl methacrylate

I claim:

1. A weather-resistant polyacetal resin composition which comprises:
   (A) a polyacetal base resin;
   (B) between 0.01 to 5 parts by weight, based on 100 parts by weight of the polyacetal base resin, of a stabilizer which is at least one compound selected from the group consisting of benzotriazoles, benzophenones, aromatic benzoates, cyanoacrylates, oxalanilides and hindered amines; and
   (C) between 0.05 to 60 parts by weight, based on 100 parts by weight of the polyacetal base resin, of a graft copolymer which is the reaction product of (a) polyethylene or copolymers comprised of ethylene and an unsaturated carboxylic acid ester and epoxidized ethylene copolymers, and (b) polymethyl methacrylate or an acrylonitrile-styrene polymer.

2. A weather-resistant polyacetal resin composition as in claim 1, wherein said graft copolymer component (C) is a graft copolymer of (i) polyethylene and polymethyl methacrylate, (ii) ethylene-ethyl acrylate copolymer and polymethyl methacrylate, (iii), ethylene-glycidyl methacrylate copolymer and polymethyl methacrylate, and (iv) ethylene-ethyl acrylate copolymer and acrylonitrile-styrene copolymer.

3. A weather-resistant polyacetal resin composition as in claim 1, wherein said stabilizer is a combination of a hindered amine with one or more compounds selected from benzotriazoles, benzophenones, aromatic benzoates, cyanoacrylates, oxalanilides and hindered amines.

4. A molded article consisting essentially of the weather-resistant polyacetal composition of claim 1, 2 or 3.

5. A molded article consisting essentially of a weather-resistant composition which comprises:
   (A) a polyacetal base resin;
   (B) between 0.01 to 5 parts by weight, based on 100 parts by weight of the polyacetal base resin, of a stabilizer which is at least one compound selected from the group consisting of benzotriazoles, benzophenones, aromatic benzoates, cyanoacrylates, oxalanilides and hindered amines; and
   (C) between 0.05 to 60 parts by weight, based on 100 parts by weight of the polyacetal base resin, of a graft copolymer which is the reaction product of (a) polyethylene or copolymers comprised of ethylene and an unsaturated carboxylic acid ester and epoxidized ethylene copolymers, and (b) polymethyl methacrylate or an acrylonitrile-styrene polymer; and wherein
   said graft copolymer component (C) is dispersed selectively on a surface of said molded article in the form of particles having a size of between about 0.5 to 2 $\mu$m.

6. A molded article as in claim 5, wherein said graft copolymer component (C) is a graft copolymer of (i) polyethylene and polymethyl methacrylate, (ii) ethylene-ethyl acrylate copolymer and polymethyl methacrylate, (iii) ethylene-glycidyl methacrylate copolymer and polymethyl methacrylate, and (iv) ethylene-ethyl acrylate copolymer and acrylonitrile-styrene copolymer.

7. A molded article as in claim 5, wherein said stabilizer is a combination of a hindered amine with one or more compounds selected from benzotriazoles, benzophenones, aromatic benzoates, cyanoacrylates, oxalanilides and hindered amines.

* * * * *

UNITED STATES PATENT AND TRADEMARK OFFICE
CERTIFICATE OF CORRECTION

Page 1 of 2

PATENT NO.   :  5,208,279

DATED        :  May 4, 1993

INVENTOR(S)  :  Toru KATSUMATA

It is certified that error appears in the above-identified patent and that said Letters Patent is hereby corrected as shown below:

Title page, item [57],
Under Abstract, line 3, change "part" to--parts--;
            line 13, after "less" change "crack" to-cracking--.

Column 1, line 32, after "surface" change "crack" to --cracks--;
         line 43, after "to" insert --an outdoor environment of-- and after "rain" delete "in";
         line 44, delete "the outdoor";
         line 51, before "addition" delete "the" and insert --its-- and after "addition" delete "thereto".

Column 3, line 21, after "such as" delete "lowering in the" and insert --lesser-- and after "and" insert --mold--;
         line 22, after "ing" delete "of molds" .

Column 4, line 1, delete "Then, the" and insert --The--;
         line 67, after "to" insert --effectively--;
         line 68, after "resistance" delete "effectively" and insert a period.

Column 5, line 4, after "the" (first occurrence) delete "object and examples" and insert --desired effect.  Examples-- and after "of" delete "the" and insert --such--;
         line 5, change "cant" to --cants-- and "agent" to --agents-- (both occurrences);
         line 6, change "agent" to --agents--;
         line 53, change "handle" to --handles--, "lid" to --lids-- and "spoiler" to --spoilers--;
         line 54, change "handle" to --handles--;
         line 55, change "handle" to --handles-- and "clip" to --clips--;
         line 56, change "camera" to --cameras--;
         line 57, change "pipe" to --pipes--.

UNITED STATES PATENT AND TRADEMARK OFFICE
CERTIFICATE OF CORRECTION

PATENT NO. : 5,208,279
DATED : May 4, 1993
INVENTOR(S) : Toru Katsumata

It is certified that error appears in the above-indentified patent and that said Letters Patent is hereby corrected as shown below:

Column 6, line 25, after "means" delete "a";
        line 32, after "means" delete "a".

Signed and Sealed this

Fifteenth Day of March, 1994

Attest:

BRUCE LEHMAN

Attesting Officer     Commissioner of Patents and Trademarks